(12) United States Patent
Liu et al.

(10) Patent No.: US 11,743,814 B2
(45) Date of Patent: Aug. 29, 2023

(54) CELL SELECTION BASED ON CLASS OF USER EQUIPMENTS

(71) Applicant: QUALCOMM Incorporated, San Diego, CA (US)

(72) Inventors: Le Liu, Fremont, CA (US); Alberto Rico Alvarino, San Diego, CA (US); Peter Gaal, San Diego, CA (US); Wanshi Chen, San Diego, CA (US); Tingfang Ji, San Diego, CA (US); Hung Dinh Ly, San Diego, CA (US); Renqiu Wang, San Diego, CA (US); Xiaoxia Zhang, San Diego, CA (US); Huilin Xu, San Diego, CA (US); Linhai He, San Diego, CA (US); Peter Pui Lok Ang, San Diego, CA (US); Jing Lei, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 142 days.

(21) Appl. No.: 16/986,128

(22) Filed: Aug. 5, 2020

(65) Prior Publication Data

US 2021/0045054 A1  Feb. 11, 2021

Related U.S. Application Data

(60) Provisional application No. 62/885,068, filed on Aug. 9, 2019.

(51) Int. Cl.
| | |
|---|---|
| H04W 48/20 | (2009.01) |
| H04L 5/00 | (2006.01) |
| H04W 36/04 | (2009.01) |
| H04W 36/00 | (2009.01) |
| H04W 36/30 | (2009.01) |

(52) U.S. Cl.
CPC ........... *H04W 48/20* (2013.01); *H04L 5/0048* (2013.01); *H04W 36/0083* (2013.01); *H04W 36/04* (2013.01); *H04W 36/30* (2013.01)

(58) Field of Classification Search
CPC ........... H04W 48/20; H04W 36/00835; H04W 36/0085; H04W 36/04; H04W 36/20;
(Continued)

(56) References Cited

U.S. PATENT DOCUMENTS

| | | | |
|---|---|---|---|
| 2008/0200171 A1* | 8/2008 | Jeong | H04W 48/10 455/436 |
| 2013/0039195 A1* | 2/2013 | Weng | H04W 48/20 370/252 |

(Continued)

FOREIGN PATENT DOCUMENTS

| | | |
|---|---|---|
| EP | 3136782 A1 | 3/2017 |
| WO | 2018143413 A1 | 8/2018 |

OTHER PUBLICATIONS

Intel Corporation: "Email Discussion Report on [99#40][MTC] UE in CE", 3GPP Draft, TSG RAN WG2 Meeting #99bis, R2-1710645, EMAILDISC-40_CE, 3rd Generation Partnership Project (3GPP), Mobile Competence Centre, 650 Route Des Lucioles, F-06921, Sophia-Antipolis Cedex, France, vol. RAN WG2, No. Prague, Czech Republic, Oct. 9, 2017-Oct. 13, 2017, Oct. 8, 2017 (Oct. 8, 2017), XP051342679, 13 pages, Retrieved from the Internet:URL: http://www.3gpp.org/ftp/Meetings_3GPP_SYNC/RAN2/Docs/ [retrieved on Oct. 8, 2017] Paragraph "6 Annex A".

(Continued)

*Primary Examiner* — Allahyar Kasraian
(74) *Attorney, Agent, or Firm* — Muncy, Geissler, Olds & Lowe P.C

(57) ABSTRACT

In a legacy gNB (e.g., pre-Rel. 17 gNB), RC UEs with only 1 or 2 receive antennas may have a geographic coverage area for control data and traffic data that is smaller than their (Continued)

geographic coverage area for SSB with respect to certain legacy gNBs. By contrast, at least some new gNBs (e.g., Rel. 17+ gNBs) have the capability to provide uniform geographic coverage for RC UEs with respect to SSB, control data and traffic data. In an aspect of the disclosure, a particular class of UEs (such as RC UEs) is steered towards particular cells (e.g., Rel. 17+ gNBs) via one or more biased class-specific cell selection parameters included in system information from the cells.

27 Claims, 10 Drawing Sheets

(58) Field of Classification Search
CPC . H04W 48/02; H04W 36/0061; H04W 36/14; H04W 36/36; H04L 5/0048; H04L 5/0053
See application file for complete search history.

(56) References Cited

U.S. PATENT DOCUMENTS

| | | | | |
|---|---|---|---|---|
| 2015/0141013 | A1* | 5/2015 | Cui | H04W 48/20 455/436 |
| 2016/0183265 | A1* | 6/2016 | Webb | H04W 52/367 370/329 |
| 2016/0353371 | A1 | 12/2016 | Zhang et al. | |
| 2018/0324667 | A1* | 11/2018 | Dong | H04W 4/06 |
| 2020/0221363 | A1* | 7/2020 | Lee | H04W 36/32 |
| 2020/0344816 | A1* | 10/2020 | Sha | H04W 72/048 |
| 2020/0374076 | A1* | 11/2020 | Wang | H04L 5/0048 |

OTHER PUBLICATIONS

Intel Corporation: "On Requirements for any Category UE with CE Support", 3GPP Draft, RAN4 Meeting #82, R4-1700661, Req For CE Support, 3rd Generation Partnership Project (3GPP), Mobile Competence Centre, 650 Route Des Lucioles, F-06921, Sophia-Antipolis Cedex, France, vol. RAN WG4, No. Athens, Greece, Feb. 13, 2017-Feb. 17, 2017, Feb. 12, 2017 (Feb. 12, 2017), XP051213815, 3 pages, Retrieved from the Internet: URL:http://www.3gpp.org/ftp/Meetings_3GPP_SYNC/RAN4/Docs/ [retrieved on Feb. 12, 2017] Paragraph "2.Discussion".

International Search Report and Written Opinion—PCT/US2020/045235—ISA/EPO—dated Nov. 12, 2020.

* cited by examiner

CELL SELECTION BASED ON CLASS OF USER EQUIPMENTS

CROSS-REFERENCE TO RELATED APPLICATION

The present Application for Patent claims the benefit of U.S. Provisional Application No. 62/885,068, entitled "CELL SELECTION BASED ON CLASS OF USER EQUIPMENTS", filed Aug. 9, 2019, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses for cell selection based on class of user equipments.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a legacy gNB (e.g., pre-Rel. 17 gNB), reduced capability/complexity (RC) UEs with only 1 or 2 receive antennas may have a geographic coverage area for control data and traffic data that is smaller than their geographic coverage area for SSB with respect to certain legacy gNBs. By contrast, at least some new gNBs (e.g., Rel. 17+ gNBs) have the capability to provide uniform geographic coverage for RC UEs with respect to SSB, control data and traffic data. In an aspect of the disclosure, a particular class of UEs (such as RC UEs) is steered towards particular cells (e.g., Rel. 17+ gNBs) via one or more biased class-specific cell selection parameters included in system information from the cells. In a specific example, by steering RC UEs to these new gNBs which can support wider geographic coverage for RC IEs in terms of control data and traffic data, performance for the RC UEs can be improved.

In an aspect of the disclosure, a method, a computer-readable medium, and an apparatus are provided. The apparatus may be a UE. The UE may belong to a particular class of UEs, such as RC UEs. The UE may receive, from a cell, system information indicating at least one cell selection parameter targeted to the first class of UEs. The UE may perform a cell selection procedure based in part on the at least one cell selection parameter. The at least one cell selection parameter may be configured to bias the cell selection procedure to favor selection of the cell by UEs belonging to the first class of UEs.

In an aspect of the disclosure, a method, a computer-readable medium, and an apparatus are provided. The apparatus may be a cell. The cell may determine at least one cell selection parameter targeted to a particular class of UEs. The cell may transmit system information indicating the at least one cell selection parameter. The at least one cell selection parameter may be configured to bias UEs belonging to the first class of UEs to favor selection of the cell.

Aspects generally include a method, apparatus, system, computer program product, non-transitory computer-readable medium, user equipment, cIoT user equipment, base station, wireless communication device, and/or processing system as substantially described with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
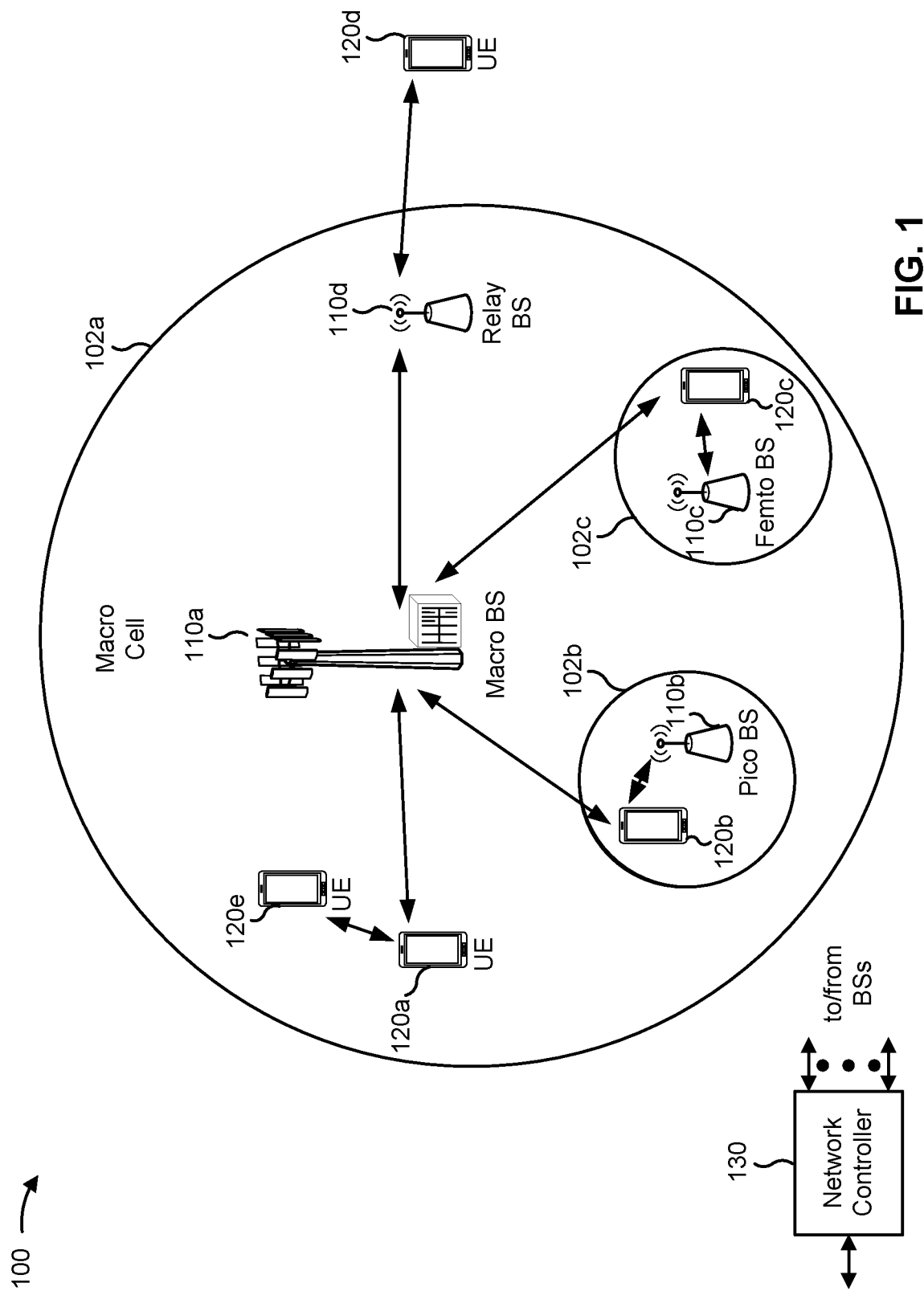
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL)_UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
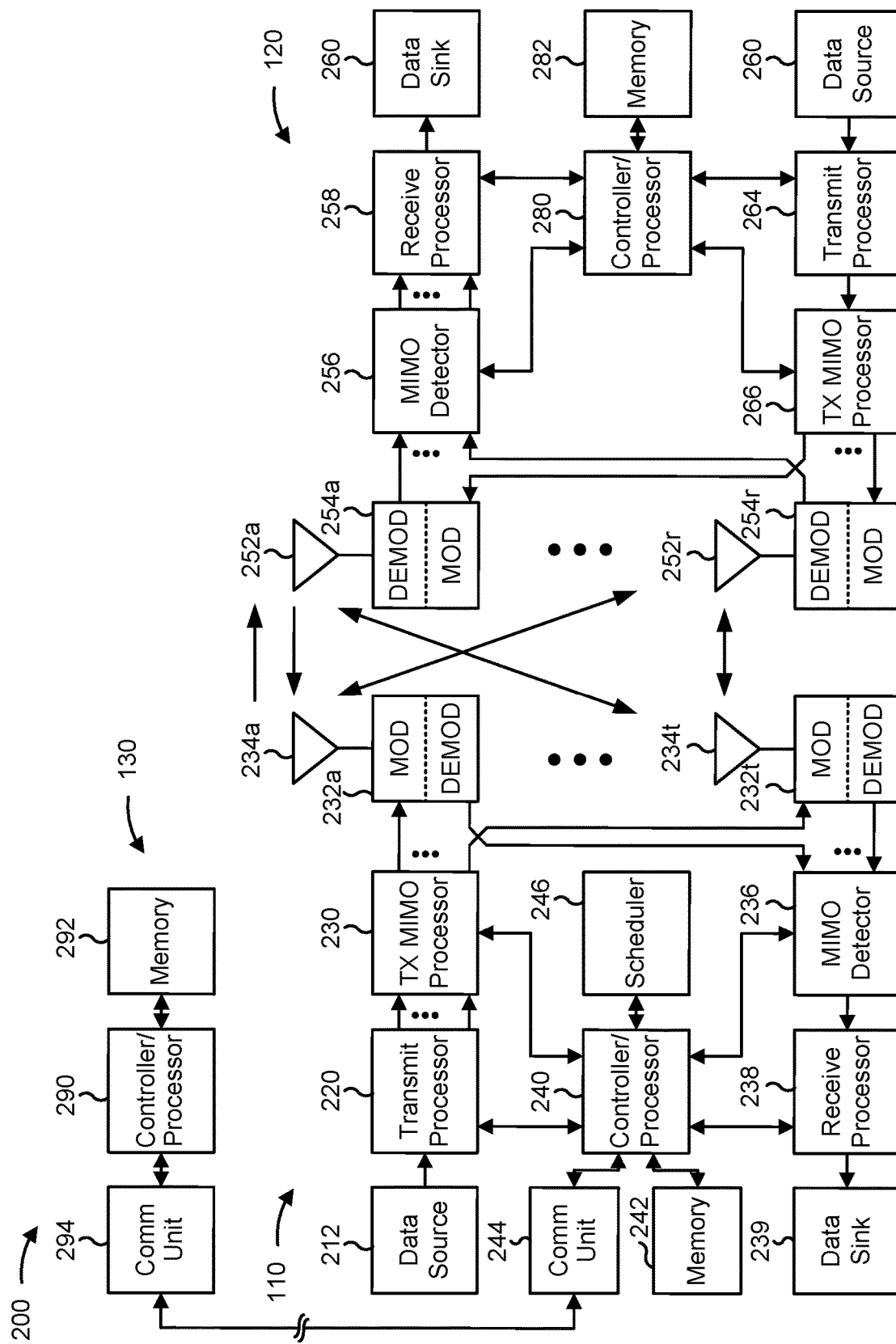
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as reduced capability/complexity or 'RC'. Examples of UE types that fall under the RC classification include wearable devices (e.g., smart watches, etc.), industrial sensors, video camera (e.g., surveillance cameras, etc.), and so on. Generally, the UE types grouped under the RC classification are associated with lower communicative capacity. For example, relative to 'normal' UEs (e.g., UEs not classified as RC), RC UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some RC UEs may also be sensitive in terms of power consumption (e.g., requiring a long battery life, such as several years) and may be highly mobile. Moreover, in some designs, it is generally desirable for RC UEs to co-exist with UEs implementing protocols such as eMBB, URLLC, LTE NB-IoT/MTC, and so on.

When a UE joins a communications system, the UE performs a cell selection procedure to identify a cell on which to camp or access. The UE may later perform a cell reselection procedure to handoff to a different cell. In some systems, cell selection is based on S criterion with parameter configuration indicated in a System Information Block (SIB) denoted as SIB1, which specifies a candidate cell must satisfy the conditions $S_{rxlev} > 0$ and $S_{qual} > 0$, whereby Srxlev and Squal are defined as follows:

$$Srxlev = Q_{rxlevmeas} - (Q_{rxlevmin} + Q_{rxlevminoffset}) - P_{compensation} - Qoffset_{temp} \qquad \text{Equation 1}$$

$$S_{qual} = Q_{qualmeas} - (Q_{qualmin} + Q_{qualminoffset}) - Qoffset_{temp} \qquad \text{Equation 2}$$

whereby $S_{rxlev}$ is the cell selection RX level value, $S_{qual}$ is the cell selection quality value $Q_{rxlevmeas}$ is measured cell rx level value (RSRP) at the UE side, $Q_{qualmeas}$ is the measured cell quality value (RSRQ), $Q_{rxlevmin}$ is a minimum required RSRP in the cell, $Q_{qualmin}$ is the minimum required quality level in the cell, $Q_{rxlevminoffset}$ is the offset to the signaled $Q_{rxlevmin}$ (e.g., to avoid ping-ponging between cells), $Q_{qualminoffset}$ is the offset to the signaled $Q_{qualmin}$, $P_{compensation}$ is the UL power compensation due to the difference between the allowed max power level and UE power class if the UE supports the additional Pmax, $Qoffset_{temp}$ is an offset temporarily used in case RRC Connection Establishment fails on a cell, $Q_{qualmeas}$ is RSRQ, $Q_{qualmin}$ is a minimum required RSRQ, and $Q_{qualminoffset}$ is an RSRQ offset (e.g., to avoid ping-ponging between cells). $Q_{rxlevmin}$, $Q_{rxlevminoffset}$, $Q_{qualmin}$, $Q_{qualminoffset}$, and $Qoffset_{temp}$ are cell-specific parameters, indicated in SIB1.

In some systems, cell reselection is based on a cell-ranking criterion $R_s$ criterion for a serving cell and $R_n$ for neighboring cells (in terms of RSRP or RSRQ), as follows:

$$R_s = Q_{meas,s} + Q_{hyst} - Qoffset_{temp} \qquad \text{Equation 3}$$

$$R_n = Q_{meas,n} - Qoffset - Qoffset_{temp} \qquad \text{Equation 4}$$

whereby $Q_{meas,s}$ corresponds to RSRP or RSRQ for the serving cell, $Q_{meas,n}$ corresponds to RSRP or RSRQ for a neighbor cell, $Q_{hyst}$ specifies the hysteresis value for ranking criteria indicated in SIB2, and Qoffset$_{temp}$ corresponds to an offset temporarily used in case RRC Connection Establishment fails on a cell. For intra-frequency cell reselection indicated in SIB2 or SIB3, Qoffset=Qoffset$_{s,n}$ (e.g., if Qoffset$_{s,n}$ is valid, otherwise Qoffset is zero). For inter-frequency cell reselection indicated in SIB4 or SIB5, Qoffset= Qoffset$_{s,n}$+Qoffset$_{frequency}$ (e.g., if Qoffset$_{s,n}$ is valid, otherwise Qoffset is Qoffset$_{frequency}$).

In a legacy gNB (e.g., pre-Rel. 17 gNB), a normal UE (e.g., a non-RC UE) and an RC UE may experience different geographic coverage in terms of synchronization signal blocks (SSBs), control data, and/or traffic data. For example, RC UEs may use two or more receive antennas to measure RSRP or RSRP by detecting SSB, while a normal UE with four or more receive antennas may detect control and data for SIB in an initial bandwidth part (BWP). However, some RC UEs with only 1 or 2 receive antennas may have a geographic coverage area for control data and traffic data that is smaller than their geographic coverage area for SSB with respect to certain legacy gNBs. For example, RC UEs may detect the same level of SSB to measure RSRP or RSRQ using one or two receive antennas, while these one or more receive antennas may not be sufficient to detect the same level of control data and/or traffic data. By contrast, at least some new gNBs (e.g., Rel. 17+ gNBs) have the capability to provide uniform geographic coverage for RC UEs with respect to SSB, control data and traffic data. In this case, the geographic coverage for a normal UE and an RC UE would be the same, and the RC UE would thereby not suffer from a reduced geographic coverage for control data and traffic data as in legacy gNBs. Hence, performance can be improved for RC UEs if this particular class of UEs can be steered to these new gNBs which can support wider geographic coverage for RC UEs in terms of control data and traffic data.

Figure 3:
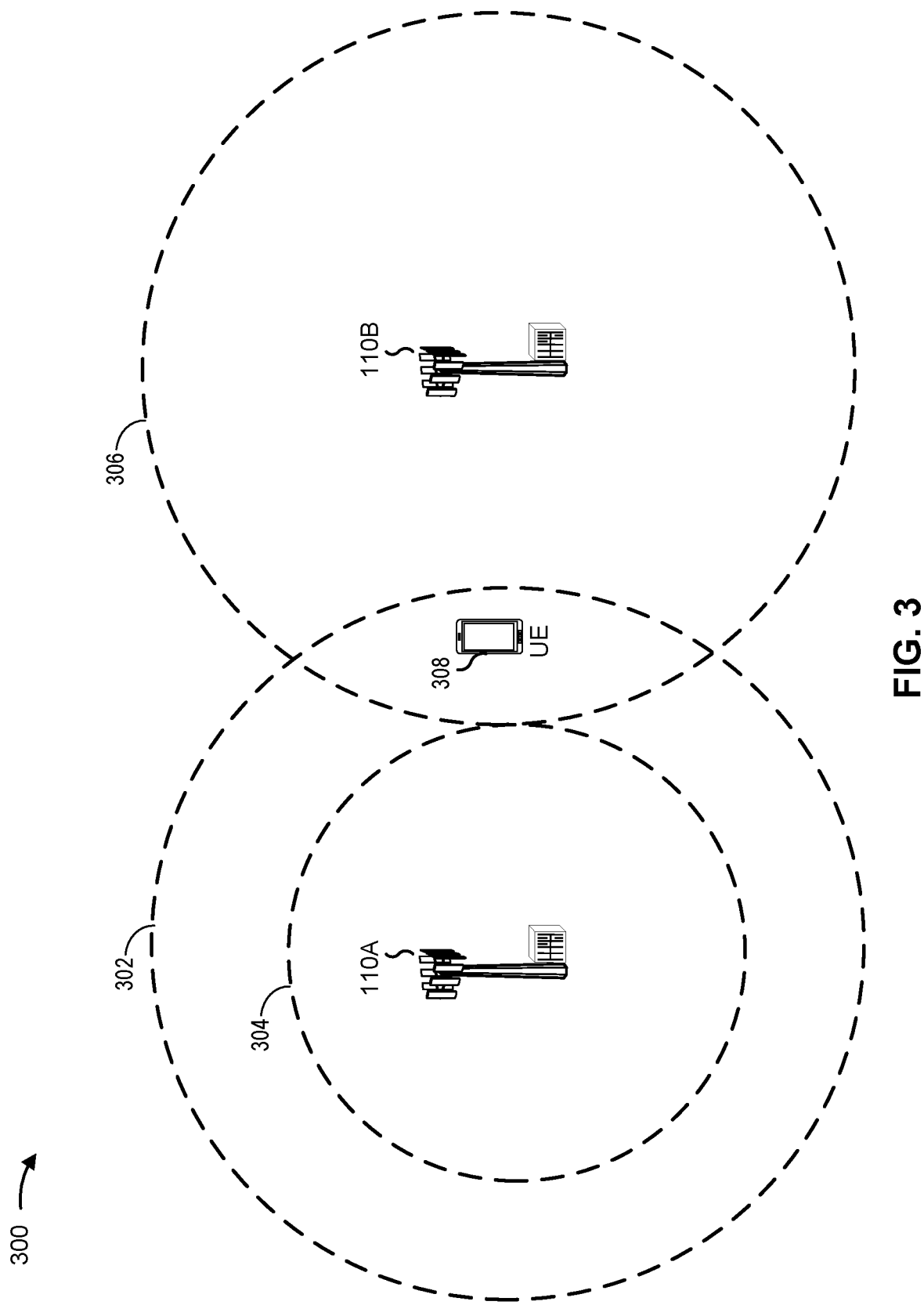
FIG. 3 illustrates a communications system in accordance with an embodiment of the disclosure.

FIG. 3 illustrates a communications system 300 in accordance with an embodiment of the disclosure. Referring to FIG. 3, gNB 110A is a legacy gNB that provides a first coverage area 302 for SSB of a first class of UEs (e.g., RC UEs) as well as SSB, control data and traffic data of a second class of UEs (e.g., non-RC UEs or so-called 'normal' UEs), and a second coverage area 304 for control data and traffic data of the first class of UEs. By contrast, gNB 110B is a base station that provides a coverage area 306 a common coverage area 306 for SSB, control data and traffic data of both the first and second classes of UEs. Hence, if UE 308 belonged to the first class of UEs, UE 308 could benefit from camping on gNB 110B instead of gNB 110A (e.g., either during initial cell selection or at cell reselection). For example, from a UE battery consumption point of view, it is better for a UE to quickly identify whether it can camp on a cell. Therefore, it may be beneficial for a UE in the first class of UEs to, as early as possible, identify whether the cell provides support to the first class of UEs (e.g., whether the cell can support the specific enhancement for geographic coverage recovery, power saving for extending battery life considering reduced capability/complexity for such UEs).

As noted above, in some designs, UEs in the first class of UEs may comprise RC UEs, such as wearables, smart watches, industrial sensors, video/surveillance cameras. In some designs, UEs in the first class of UEs may be require geographic coverage compensation due to a limited band, limited number of transmit/receive antennas, smaller size, limited transmit power, and/or relaxed UE processing time/capability. In some designs, UEs in the second class of UEs may comprise non-RC UEs, such as smartphones, laptop computers, desktop computers, tablet computers, and so on.

Embodiments of the disclosure are thereby directed to cell selection (e.g., initial cell selection or cell reselection) whereby UEs belonging to a particular class of UEs (e.g., RC UEs) are biased to select or handoff to base stations that can provide enhanced geographic coverage relative to legacy base stations (i.e., base stations that do not provide enhanced geographic coverage for RC UEs).

Figure 4:
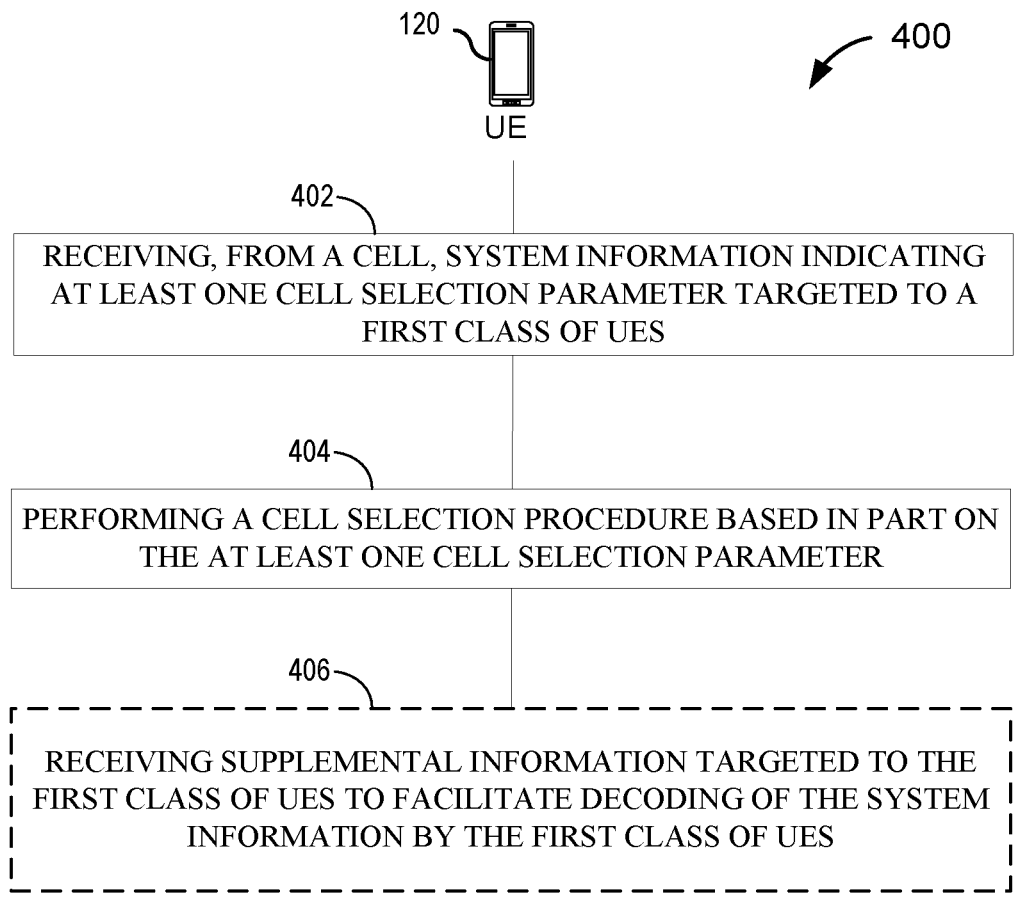
FIG. 4 illustrates an exemplary process of performing cell selection according to an aspect of the disclosure.

FIG. 4 illustrates an exemplary process 400 of performing cell selection according to an aspect of the disclosure. The process 400 of FIG. 4 is performed by UE 110.

At 402, the UE (e.g., controller/processor 280, antenna(s) 252a . . . 252r, demodulators(s) 254a . . . 254r, MIMO detector 256, RX processor 258) receives, from a cell, system information indicating at least one cell selection parameter targeted to a first class of UEs. In some designs, the first class of UEs may correspond to RC UEs. In other designs, the first class of UEs may be defined in terms of one or more performance characteristics (e.g., maximum bandwidth, maximum transmission power, number of receive antennas, a combination thereof, etc.). In an example, the system information may be received at 402 in one or more System Information Blocks (SIBs), such as one or more of SIB1-SIB5, as described below in more detail. In a specific example, the system information may comprise a 10 MHz SIB1, or a combination of 10 MHz SIB1s received at different times (e.g., in a scenario where the UE is limited to monitoring 10 MHz of bandwidth at a given time). In an example, the at least one cell selection parameter may correspond to one or more parameters associated with initial cell selection (e.g., one or more new cellselectionInfo SIB1 parameters). In another example, the at least one cell selection parameter may correspond to one or more new cell reselection parameters (e.g., one or more new SIB2-SIB5 parameters). In some designs, the system information received at 402 may further comprise system information targeted to a second class of UEs (e.g., normal or non-RC UEs). In a specific example, the at least one cell selection parameter may comprise a received signal offset (e.g., RSRP or RSRQ offset), a minimum performance threshold, and so on. Further, the at least one cell selection parameter may be included in the system information, or alternatively a value that references the at least one cell selection parameter may be included in the system information, as will be described below in more detail. Also, as will be disclosed in more detail below, the at least one cell selection parameter may pertain either to a non-serving cell (e.g., pre-cell selection), a serving cell, or a neighbor cell.

At 404, the UE (e.g., controller/processor 280, antenna(s) 252a . . . 252r, demodulators(s) 254a . . . 254r, MIMO detector 256, RX processor 258) performs a cell selection procedure based in part on the at least one cell selection parameter. In an example, the cell selection procedure performed at 404 may correspond to an initial cell selection procedure or to a cell reselection procedure. In this case, the cell from which the system information is received at 402 may correspond to the serving cell of the UE, and the cell selection parameter(s) may correspond to cell reselection parameter(s). As noted above, the system information received at 402 may further comprise system information targeted to a second class of UEs (e.g., non-RC UEs). In such system information is received, then the cell selection procedure at 404 is performed without factoring in the at least one other cell selection parameter targeted to the second class of UEs. In an example, the at least one cell selection parameter received at 402 is configured to bias the cell selection procedure at 404 to favor selection of the cell by the UE (e.g., as well as other UEs belonging to the first class of UEs).

At 406, the UE (e.g., controller/processor 280, antenna(s) 252a ... 252r, demodulators(s) 254a ... 254r, MIMO detector 256, RX processor 258) optionally receives supplemental information targeted to the first class of UEs to facilitate decoding of the system information by the first class of UEs. For example, for reasons that will be described in more detail below (e.g., bandwidth limitations, etc.), the system information is capable of receiving (e.g., 10 MHz SIB1) may comprise only part of the system information transmitted by the base station (e.g., 20 MHz SIB1). In this case, the supplemental information received at 406 may be used to compensate for the missing or non-decoded part of the transmitted system information. In one example, if the system information is received in an initial SIB1 (e.g., 10 MHz SIB1, out of a total 20 MHz SIB1 transmitted by the base station), the supplemental information may correspond to an extra SIB1 (e.g., an extra 10 MHz SIB1, which may be received earlier than a next scheduled SIB1 for normal UEs) that is specifically targeted to UEs among the first class of UEs. In this case, the extra SIB1 may be used to help decode the initial SIB1 via combining (e.g., LLR combining before an initial SIB1 decode, or combining after an initial SIB1 decode). In other designs, as will be described in more detail, the supplemental information received at 406 can be received in advance of SIB1 (e.g., before 402) to provide an early indication of a cell's capability to support RC UEs.

Figure 5:
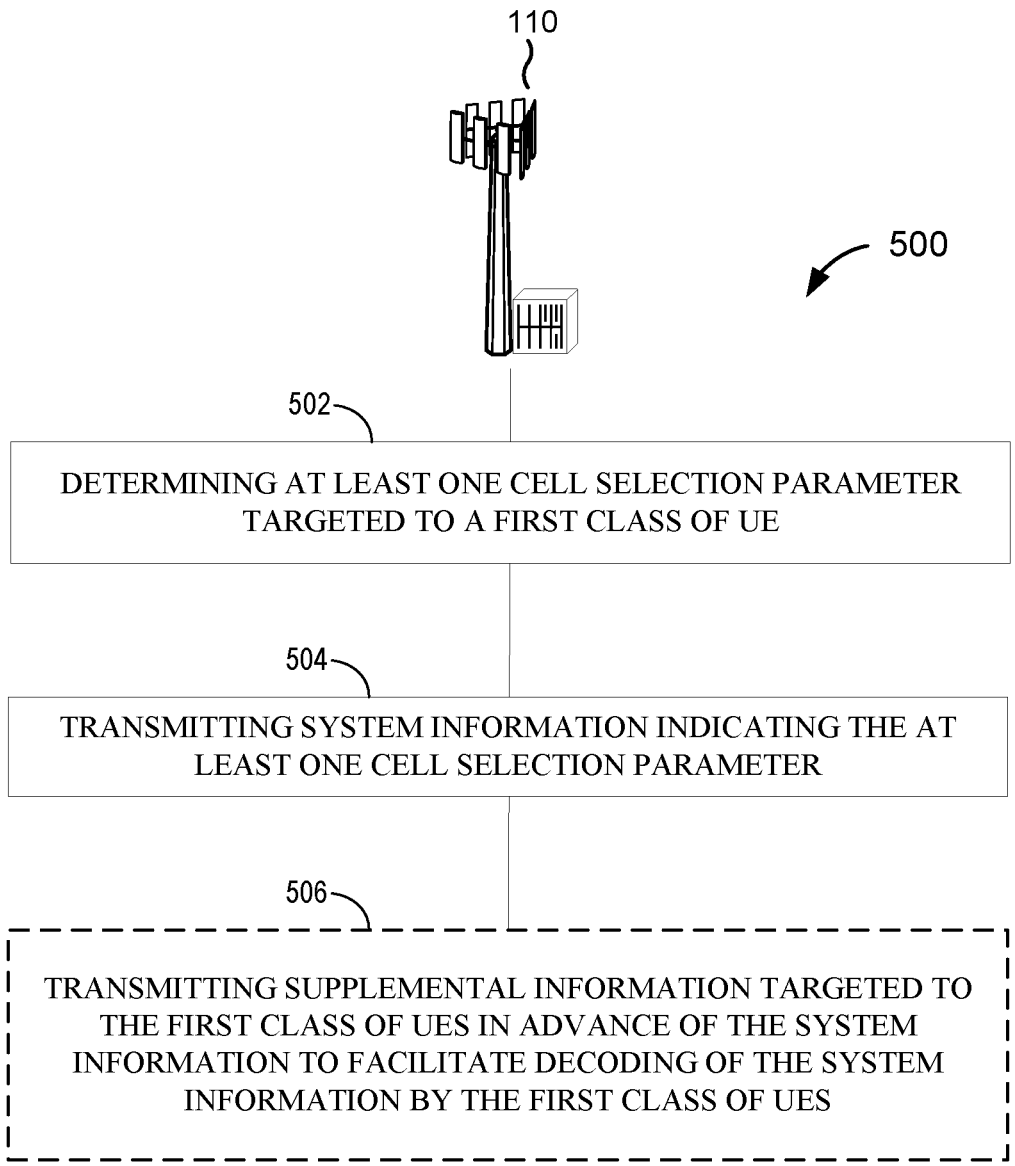
FIG. 5 illustrates an exemplary process of conveying cell selection parameter(s) according to an aspect of the disclosure.

FIG. 5 illustrates an exemplary process 500 of conveying cell selection parameter(s) according to an aspect of the disclosure. The process 500 of FIG. 5 is performed by BS 110.

At 502, the BS (e.g., controller/processor 240) determines at least one cell selection parameter targeted to a first class of user equipments (UEs). In some designs, the first class of UEs may correspond to RC UEs. In other designs, the first class of UEs may be defined in terms of one or more performance characteristics (e.g., maximum bandwidth, maximum transmission power, number of receive antennas, a combination thereof, etc.). In an example, the at least one cell selection parameter may correspond to one or more parameters associated with initial cell selection (e.g., one or more new cellselectionInfo SIB1 parameters). In another example, the at least one cell selection parameter may correspond to one or more new cell reselection parameters (e.g., one or more new SIB2-SIB5 parameters). In a specific example, the at least one cell selection parameter may comprise a received signal offset (e.g., RSRP or RSRQ offset), a minimum performance threshold, and so on. Further, the at least one cell selection parameter may be included in the system information, or alternatively a value that references the at least one cell selection parameter may be included in the system information (e.g., the value can be indexed to predetermined parameter(s) at the UE(s), or the value may be a Boolean-type indicator of a particular cell selection parameter, such as whether RC UEs are permitted or barred from cell access. Also, as will be disclosed in more detail below, the at least one cell selection parameter may pertain either to a non-serving cell (e.g., pre-cell selection), a serving cell, or a neighbor cell.

At 504, the BS (e.g., controller/processor 240, antenna(s) 234a ... 234r, modulators(s) 232a ... 232r, Tx MIMO processor 230, TX processor 220) transmits system information (e.g., 20 MHz SIB1, with 10 MHz SIB1 part capable of separate decoding for UEs with sufficient SINR) indicating the at least one cell selection parameter. In an example, the at least one cell selection parameter may be sent to facilitate one or more UEs in the first class of UEs to perform an initial cell selection procedure. In an alternative example, the cell selection procedure performed at 404 may correspond to a cell reselection procedure. In this case, the cell from which the system information is received at 402 or the cell performing 504 may correspond to the serving cell of the UE, and the cell selection parameter(s) may correspond to cell reselection parameter(s). In an example, the system information may be transmitted at 504 in one or more SIBs, such as one or more of SIB1-SIB5, as described below in more detail. In some designs, the system information transmitted at 504 may further comprise system information targeted to a second class of UEs (e.g., normal or non-RC UEs). In an example, the at least one cell selection parameter transmitted at 504 is configured to bias cell selection procedures at UEs among the first class of UEs in favor selection of the cell.

At 506, the BS (e.g., controller/processor 240, antenna(s) 234a ... 234r, modulators(s) 232a ... 232r, Tx MIMO processor 230, TX processor 220) optionally transmits supplemental information targeted to the first class of UEs in advance of the system information to facilitate decoding of the system information by the first class of UEs. For example, for reasons that will be described in more detail below (e.g., bandwidth limitations, etc.), UEs in the first class of UEs may not be able to monitor the entirety of the system information transmitted at 504 (e.g., 20 MHz SIB1), and may have difficulty in decoding the system information on a monitored part (e.g., 10 MHz SIB1). In this case, the supplemental information transmitted at 506 may be used to compensate for the missing or non-decoded part of the system information. In one example, if the system information is transmitted in an initial SIB1 (e.g., 10 MHz) at 504, the supplemental information transmitted at 506 may correspond to an extra SIB1 (e.g., an extra 10 MHz SIB1, which may be received earlier than a next scheduled SIB1 for normal UEs) that is specifically targeted to UEs among the first class of UEs. In this case, the extra SIB1 may be used to help decode the initial SIB1 via combining (e.g., LLR combining before an initial SIB1 decode, or combining after an initial SIB1 decode). In other designs, as will be described in more detail, the supplemental information can be transmitted at 506 in advance of SIB1 (e.g., before the transmission of 504) to provide an early indication of a cell's capability to support RC UEs.

Referring to FIGS. 4-5, in one example, the at least one cell selection parameter received at 402 or transmitted at 504 may correspond to one or more new cellselectionInfo SIB1 parameters.

In a first example, the at least one cell selection parameter received at 402 or transmitted at 504 may comprise class-specific received signal offset(s), as follows:

$$S_{rx}\text{lev} = Q_{rxlevmeas} - (Q_{rxlevmin} + Q_{rxlevminoffset}) - P_{compensation} - Q\text{offset}_{temp} + Q_{rx}\text{levoffset}_{ClassX} \quad \text{Equation 5}$$

$$S_{qual} = Q_{qualmeas} - (Q_{qualmin} + Q_{qualminoffset}) - Q\text{offset}_{temp} + Q_{rx}\text{levoffset}_{ClassX} \quad \text{Equation 6}$$

whereby $Q_{rx}\text{levoffset}_{ClassX}$ is an offset to be used only by the UEs belonging to the first class of UEs (e.g., RC UEs). Generally, higher values of $Q_{rx}\text{levoffset}_{ClassX}$ are associated with a higher probability that a UE belonging to the first class of UEs will select that cell (e.g., so as to 'steer' such UEs to that cell). Also, UEs that do not belong to the first class of UEs will cancel, zero out or assume some minimum value for $Q_{rx}\text{levoffset}_{ClassX}$. As used herein, ClassX is used to designate any the first class of UEs.

In a second example, the at least one cell selection parameter received at 402 or transmitted at 504 may comprise class-specific minimum received signal threshold(s), as follows:

$$S_{rx}lev = Q_{rxlevmeas} - (Q_{rxlevmin\_ClassX} + Q_{rxlevminoffset}) - P_{compensation} - Q\text{offset}_{temp} \quad \text{Equation 7}$$

$$S_{qual} = Q_{qualmeas} - (Q_{qualmin\_ClassX} + Q_{qualminoffset}) - Q\text{offset}_{temp} \quad \text{Equation 8}$$

whereby $Q_{rxlevminoffset}$ is a class-specific minimum required RSRP. Generally, lower values of $Q_{qualmin\_ClassX}$ are associated with a higher probability that a UE belonging to the first class of UEs will select that cell. Also, UEs that do not belong to the first class of UEs will ignore $Q_{rxlevmin\_ClassX}$, and will instead use $Q_{rxlevmin}$ as in Equations 1-2.

In a third example, the at least one cell selection parameter received at 402 or transmitted at 504 may be indicated via a value that provides a reference to the at least one cell selection parameter. For example, the at least one cell selection parameter may be indexed to a predetermined value maintained at the UE, and then looked up from the table once the value is extracted from the system information. In some designs, the value can be as small as a single bit, and the table may comprise a predefined threshold or offset list (e.g., $Qrxlevoffset_{ClassX}$, $Q_{rxlevmin\_ClassX}$, $Q_{qualmin\_ClassX}$, etc.) that can be based on UE class status (e.g., RC UE, number of receive antennas, minimum bandwidth requirement, power class, etc.).

In a fourth example, the at least one cell selection parameter received at 402 or transmitted at 504 may be indicated via a value that indicates whether UEs that belong to the first class of UEs are permitted to select an associated cell. In some designs, the value can be as small as a single bit. In an example specific to RC UEs, the value may be set to 0 to permit access by RC UEs, or to 1 to block access by RC UEs. In another example specific to RC, the value may be set to 1 to permit access by RC UEs, or to 0 to block access by RC UEs.

In some designs, the first class of UEs may be divided into a tiered sub-class hierarchy, whereby different cell selection parameter(s) are triggered for each sub-class. One such example is depicted below in Table 1, as follows:

TABLE 1

| UE Type | UE Max Bandwidth Relative to Bandwidth Requirement | Receive Antenna | Offset |
|---|---|---|---|
| Legacy UE | 1 | 4 | 0 dB |
| UE Type 1 | 1 | 2 | +3 dB |
| UE Type 1a | 1 | 1 | +6 dB |
| UE Type 2 | ½ | 2 | +6 dB |
| UE Type 2a | ½ | 1 | +9 dB |
| UE Type 3 | ¼ | 2 | +9 dB |
| UE Type 3a | ¼ | 1 | +12 dB |

As will be appreciated from a review of Table 1, higher offsets (e.g., to offset $Q_{min}$) are defined for cell selection (e.g., initial cell selection or cell reselection) as the UE capability decreases. Hence, while UE types 1-3a may all fall broadly under the classification of RC, the RC class may be subdivided so as to accommodate offsets tuned to the specific UE capabilities of individual RC UEs.

As shown in Table 1 (above), some RC UEs may have sufficient bandwidth to decode SIB1 in an initial BWP. However, other RC UEs (e.g., UE Types 2, 2a, 3 and 3a) may not have sufficient bandwidth. For example, the bandwidth requirement for decoding SIB1 may be 20 MHz, whereas some RC UEs may only support up to 10 MHz. In some designs, such RC UEs may perform SIB1 combining to derive the system information. In other designs, at 406 of FIG. 4 or 506 of FIG. 5, an additional SIB1 can be introduced to help speed up the SIB1 detection for such UEs (e.g., so RC UEs that cannot decode a first instance of SIB1 can perform SIB1 combining more quickly than having to wait for the next normally scheduled periodic SIB1). In this case, RC UEs decode an initial SIB1 targeted to both RC UEs and non-RC UEs at 402, and then RC UEs decode a supplemental SIB1 targeted specifically to the RC UEs at 406 before a next instance of the periodic SIB1 that targets both RC UEs and non-RC UEs.

In a further example, separate cyclic redundancy check (CRC) bits may be used for the initial SIB1 (e.g., 10 MHz SIB1 part of 20 MHz SIB1, which may be independently decodable) and the supplemental SIB1. In some designs, SIB1 may be associated with a relatively low coding rate, and the initial SIB1 (e.g., 10 MHz) may be decodable by RC UEs with high SINR. If the initial SIB1 and supplemental SIB1 comprise the same content, an RC UE with low SINR can perform log likelihood radio (LLR) combining before decoding the respective SIB1s. In other designs, the initial SIB1 and supplemental SIB1 may be decoded separately and then combined.

Figure 6:
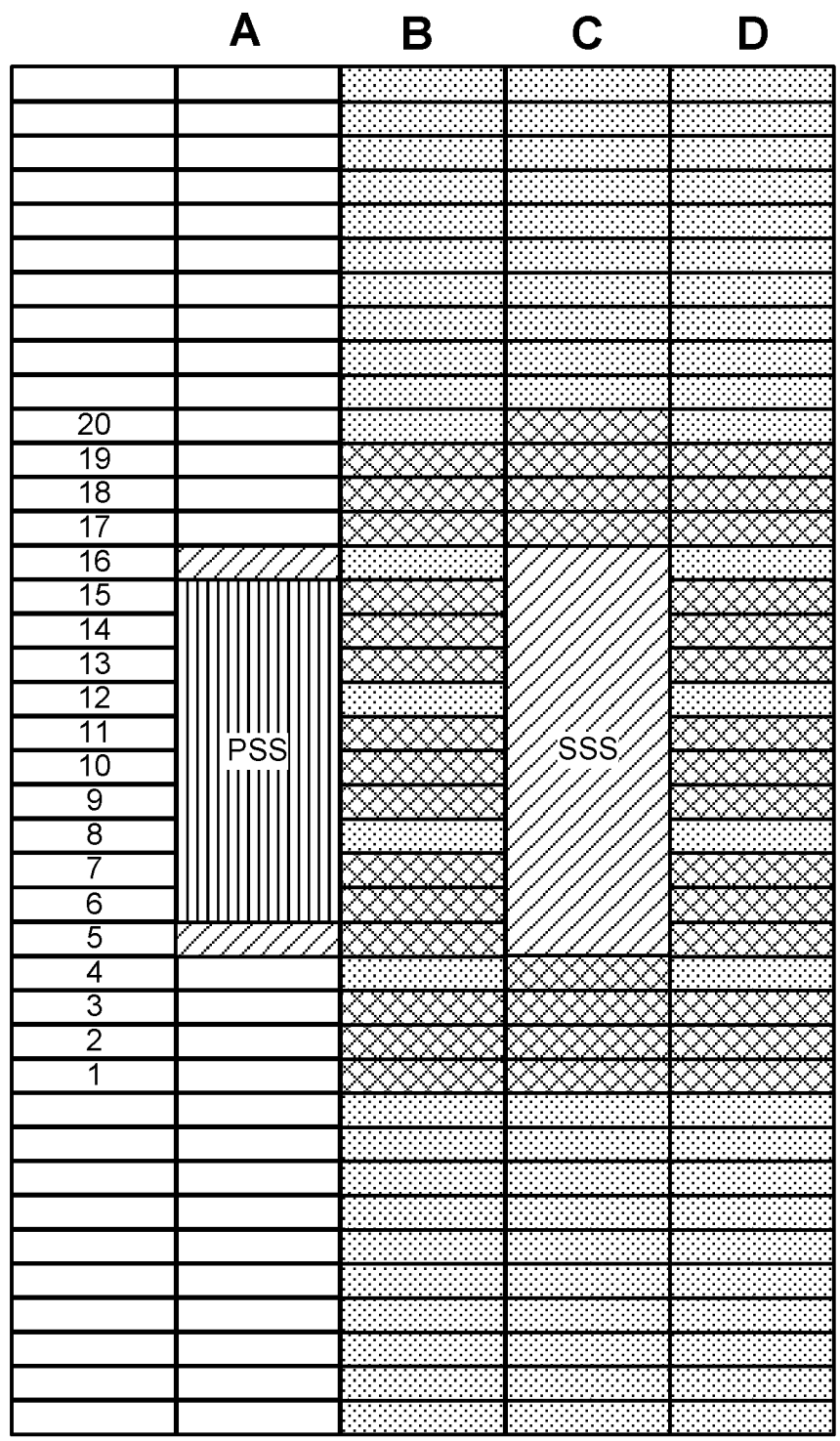
FIG. 6 illustrates a resource block allocation in according to an aspect of the disclosure.

In some designs, at 406 of FIG. 4 or 506 of FIG. 5, signal(s) can be transmitted in advance of SIB1 to provide an early indication of a cell's capability to support RC UEs. For example, assume that SSB occupies 20 RBs, and RC UE bandwidth is 5 MHz (24 RBs at SCS=15 kHz), 10 MHz (48 RBs at SCS=15 kHz) or 20 MHz (96 RBs at RBs at SCS=15 kHz). In one example, a value (e.g., a single bit) corresponding the at least one cell selection parameter can be added to a Master Information Block (MIB). In another design, the value can be added to an additional DMRS (or plus PBCH) outside of the SSB band (e.g., no impact to PSS or SSS). For example, in FIG. 6, the value can be added to a DMRS in band B or D, which does not conflict with the PSS in band A or the SSS in bands A and C.

Referring to FIGS. 4-5, in a further example, the at least one cell selection parameter received at 402 or transmitted at 504 may correspond to one or more new cell reselection parameters (e.g., SIB2-SIB5 parameters). In some designs, the one or more new cell reselection parameters may be configured so as to have no impact upon legacy RC devices (e.g., non-RC devices).

In a first example, the one or more new class-specific cell reselection parameters received at 402 or transmitted at 504 may comprise class-specific received signal offset(s) configured to bias the cell reselection in favor of selection of neighbor cells that provide class-specific support (e.g., RC control data and data traffic coverage support), as follows:

$$R_n = Q_{meas,n} - Q\text{offset}_{ClassX} - Q\text{offset}_{temp} \quad \text{Equation 9}$$

whereby $Q\text{offset}_{ClassX}$ is a class-specific Qoffset. Generally, lower values of $Q\text{offset}_{ClassX}$ are associated with a higher probability that a UE belonging to the first class of UEs will select that cell. For intra-frequency cell reselection indicated in SIB2 or SIB3, $Q\text{offset}_{ClassX} = Q\text{offset}_{ClassX,s,n}$ (e.g., if $Q\text{offset}_{ClassX,s,n}$ is valid, otherwise $Q\text{offset}_{ClassX}$ is zero). For inter-frequency cell reselection indicated in SIB4 or SIB5, $Q\text{offset}_{ClassX} = Q\text{offset}_{ClassX,s,n} + Q\text{offset}_{frequency}$ (e.g., if $Q\text{offset}_{ClassX,s,n}$ is valid, otherwise $Q\text{offset}_{ClassX}$ is $Q\text{offset}_{frequency}$).

In a second example, the one or more new class-specific cell reselection parameters received at 402 or transmitted at 504 may be introduced in SIB3 and SIB4. For example, a new class-specific offset denoted as "q-RxLevOffset-Cell_ClassX" may be added to an intra-frequency neighbor cell information field of SIB3 and a new class-specific offset denoted as "q-QualOffsetCell_ClassX" may be added to an inter-frequency neighbor cell information field of SIB4, in a manner similar to Equations 7-8 which is described above with respect to initial cell selection. So, the class-specific offset(s) noted above may be used in place of the default offset(s) used In a third example, the one or more new class-specific cell reselection parameters received at 402 or transmitted at 504 may be indicated in via a value that provides a reference to the at least one cell selection parameter. For example, the one or more new class-specific cell reselection parameters may be indexed to a predetermined value maintained at the UE, and then looked up from the table once the value is extracted from the system information. In some designs, the value can be as small as a single bit, and the table may comprise a predefined threshold or offset list (e.g., $Qoffset_{ClassX}$, q-RxLevOffsetCell_ClassX, q-QualOffset-Cell_ClassX, etc.) that can be based on UE class status (e.g., RC UE, number of receive antennas, minimum bandwidth requirement, power class, etc.).

In a fourth example, the one or more new class-specific cell reselection parameters received at 402 or transmitted at 504 may comprise a black list of cells that are prohibited from cell reselection. For example, for intra-frequency cell reselection, an intra-frequency black cell list field for ClassX can be added to SIB3 to include cells not supporting class-specific (or class-enhanced) cell selection and reselection. Likewise, for inter-frequency cell reselection, an inter-frequency black cell list field for ClassX can be added to SIB4 to include cells not supporting class-specific (or class-enhanced) cell selection and reselection. Alternatively, the one or more new class-specific cell reselection parameters received at 402 or transmitted at 504 may comprise a white list of cells that are allowed for cell reselection. For example, for intra-frequency cell reselection, an intra-frequency white cell list field for ClassX can be added to SIB3 to include cells supporting class-specific (or class-enhanced) cell selection and reselection. Likewise, for inter-frequency cell reselection, inter-frequency white cell list for ClassX can be added to SIB4 to include cells supporting class-specific (or class-enhanced) cell selection and reselection.

In a fifth example, the one or more new class-specific cell reselection parameters received at 402 or transmitted at 504 may be indicated via a value that indicates whether UEs that belong to the first class of UEs are permitted to select an associated neighbor cell. In some designs, the value can be as small as a single bit. In an example specific to RC, the value may be designated in an intra-frequency neighbor cell information field of SIB3 or in an inter-frequency neighbor cell information field of SIB4, whereby the value can be set to 0 to permit reselection by RC UEs, or to 1 to block reselection by RC UEs. In another example specific to RC, the value may be designated in an intra-frequency neighbor cell information field of SIB3 or in inter-frequency neighbor cell information field of SIB4, whereby the value can be set to 1 to permit reselection by RC UEs, or to 0 to block reselection by RC UEs.

In a fifth example, the one or more new class-specific cell reselection parameters received at 402 or transmitted at 504 may comprise cell priorities for UEs that belong to the first class of UEs.

In an example specific to RC UEs, for intra-frequency cell reselection, a configuration of cell priority for RC UEs can be defined independently from a cell reselection serving frequency information field in SIB2 (e.g., common priority for intra-frequency cells). For example, cell priority can be defined relative to the serving cell of intra-frequency cells on top of the reselection serving frequency information field. For example, a cell reselection priority cell field for RC UEs can be defined in an intra-frequency neighbor cell information field of SIB3 for neighbor cell.

In another example specific to RC UEs, for inter-frequency cell reselection, a configuration of cell priority for RC UEs can be defined independently from an inter-frequency carrier frequency information field in SIB4 (e.g., different priority for inter-frequency cells but common within same frequency). For example, cell priority can be defined on top of the inter-frequency carrier frequency information field. For example, a cell reselection priority cell field for RC UEs can be defined in inter-frequency neighbor cell information field of SIB4 for neighbor cell.

In some designs, the above-noted examples of modified class-specific cell selection and cell reselection can be applied by particular gNBs either together or separately based on cell type. In an example specific to RC UEs, a first type of cell ("Type 1") may correspond to a Rel. 17 (or later) gNB with support for RC geographic coverage enhancements, a second type of cell ("Type 2") may correspond to a Rel. 17 (or later) gNB without support for RC geographic coverage enhancements, and a third type of cell ("Type 3") may correspond to a pre-Rel. 17 gNB without support for RC geographic coverage enhancements. In this case, even though Type 2 cells do not support RC geographic coverage enhancements, Type 2 cells can still advertise neighbor cell information to facilitate some or all of the cell reselection enhancements noted above, as shown in Table 2 as follows:

TABLE 2

| | Type 1 Cell | Type 2 Cell | Type 3 Cell |
| --- | --- | --- | --- |
| Modified (Initial) Cell Selection | Yes | No | No |
| Modified Cell Reselection | Yes (e.g., to indicate whether neighbor cells are suitable for RC geographic coverage enhancement) | Yes (e.g., to indicate whether neighbor cells are suitable for RC geographic coverage enhancement) | No |

Hence, it will be appreciated that the process 500 of FIG. 5 could be performed by either a Type 1 cell or a Type 2 cell, and likewise that the system information received at 402 of FIG. 4 could be received from a Type 1 cell or a Type 2 cell.

Figure 7:
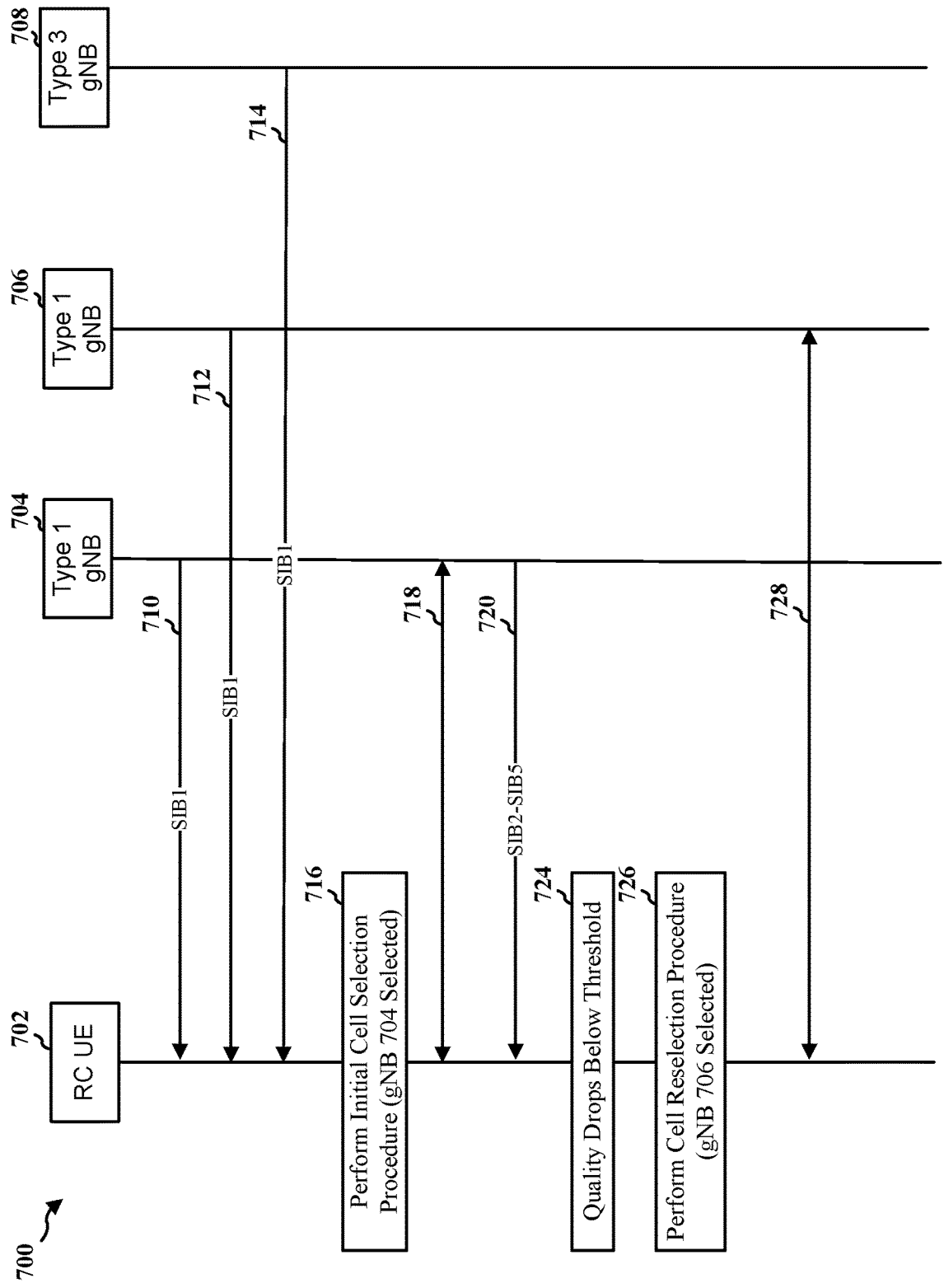
FIG. 7 illustrates an example implementation of the processes of FIGS. 4-5 in accordance with an embodiment of the disclosure.

FIG. 7 illustrates an example implementation 700 of the processes 400-500 of FIGS. 4-5 in accordance with an embodiment of the disclosure. At the outset, assume that an RC UE 702 is in range of gNBs 704, 706 and 708, whereby gNB 704 is a Type 1 cell, gNB 706 is a Type 1 cell, and gNB 708 is a Type 3 cell. At 710-714, gNBs 704-708 each transmit system information to the RC UE 702 via respective SIB1s. In this case, the SIB1s of 710-712 from gNBs 704-706 each correspond to 502-504 of FIG. 5 and includes class-specific (e.g., in this example, RC specific) cell selection parameter(s), and receipt of the SIB1s 710-712 at the RC UE 702 each correspond to 402 of FIG. 4. At 716 (e.g., as in 404 of FIG. 4), RC UE 702 performs an initial cell selection procedure and selects gNB 704 for attachment based at least in part on the class-specific cell selection parameter(s) in the SIB1s 710-712. For example, the selection of gNB 704 at 716 may be based in part upon the class-specific cell selection parameter(s) in the SIB1 of 710 which are configured to bias the cell selection procedure to favor selection of gNB 704 by RC UEs. In this case, the RC 702 UE may select gNB 704 even if gNB 708 has a higher quality connection due in part to the RC geographic coverage enhancements of the Type 1 cell configuration of gNB 704.

At 718, the RC UE 702 communicates with the network via gNB 704 for some period of time. At 720 (e.g., as in 402 of FIG. 4 or 504 of FIG. 5), the RC UE 702 receives one or more of SIB2-SIB5 which convey one or more class-specific cell reselection parameter(s) as noted above. At 722, the RC UE 702 determines that a quality associated with its connection to gNB 704 has dropped below a threshold. At 724 (e.g., as in 404 of FIG. 4), RC UE 702 performs a cell reselection procedure and selects gNB 706 for either an intra-frequency or inter-frequency handoff based at least in part on the class-specific cell selection parameter(s) in the SIB(s) of 720. For example, the selection of gNB 706 at 726 may be based in part upon the class-specific cell selection parameter(s) in a SIB2, SIB3, SIB4 or SIB5 of 720 which are configured to bias the cell selection procedure to favor selection of gNB 706 by RC UEs. In this case, the RC 702 UE may select gNB 706 even if gNB 708 has a higher quality connection due in part to the RC geographic coverage enhancements of the Type 1 cell configuration of gNB 706. At 728, the RC UE 702 communicates with the network via gNB 706 for some period of time.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 8:
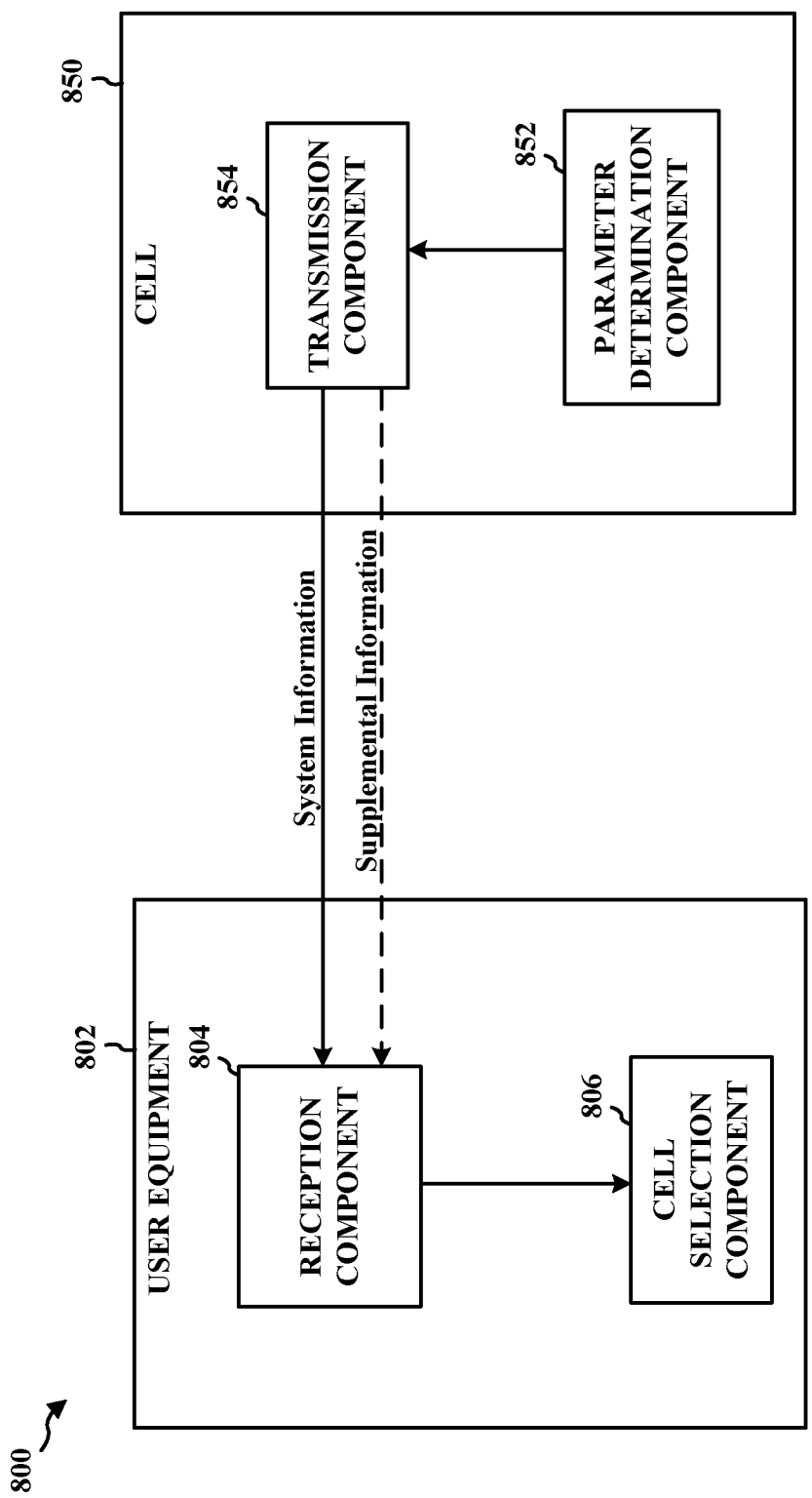
FIG. 8 is a conceptual data flow diagram illustrating data flow between different means/components according to an aspect of the disclosure.

FIG. 8 is a conceptual data flow diagram 800 illustrating the data flow between different means/components in exemplary apparatuses 802 and 804. The apparatus 802 may be a UE in communication with an apparatus 850, which may be a cell (e.g., a gNB or base station).

The apparatus 802 includes a reception component 804, which may correspond to receiver circuitry in UE 120 as depicted in FIG. 2, including controller/processor 280, antenna(s) 252a . . . 252r, demodulators(s) 254a . . . 254r, MIMO detector 256, RX processor 258. The apparatus 802 further includes a cell selection component 806, which may correspond to processor circuitry in UE 120 as depicted in FIG. 2, including controller/processor 280.

The apparatus 850 includes a parameter determination component 852, which may correspond to processor circuitry in BS 110 as depicted in FIG. 2, including controller/processor 240. The apparatus 802 further includes a transmission component 854, which may correspond to transmission circuitry in BS 110 as depicted in FIG. 2, including controller/processor 240, antenna(s) 234a . . . 234r, modulators(s) 232a . . . 232r, Tx MIMO processor 230, TX processor 220.

Referring to FIG. 8, the parameter determination component 852 determines one or more cell selection parameters targeted to a particular class of UEs, such as RC UEs. The parameter determination component 852 sends the determined cell selection parameter(s) to the transmission component 854. The transmission component 854 transmits the cell selection parameter(s) as part of system information at least to the reception component 804. The transmission component 854 may also optionally transmit the supplemental information that includes some or all of the cell selection parameter(s) at least to the reception component 804. The reception component 804 sends the cell selection parameter(s) to the cell selection component 806, which performs a cell selection or reselection procedure based in part upon the cell selection parameter(s).

One or more components of the apparatus 802 and apparatus 850 may perform each of the blocks of the algorithm in the aforementioned flowcharts of FIGS. 4, 5 and 7. As such, each block in the aforementioned flowcharts of FIGS. 4, 5 and 7 may be performed by a component and the apparatus 802 or apparatus 850 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
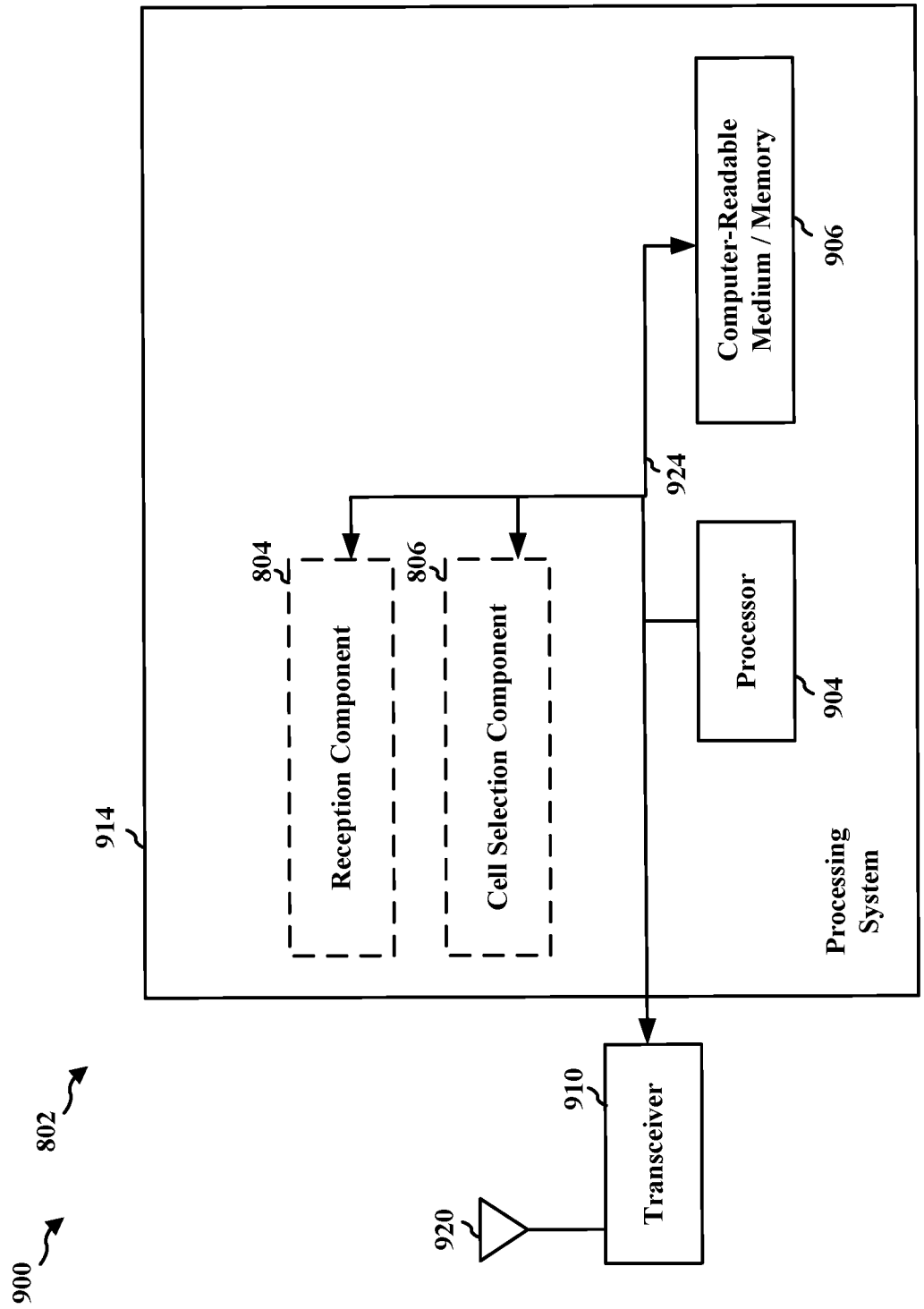
FIG. 9 is a diagram illustrating an example of a hardware implementation for an apparatus employing a processing system according to an aspect of the disclosure.

FIG. 9 is a diagram 900 illustrating an example of a hardware implementation for an apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804 and 806, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804 and 806. The components may be software components running in the processor 904, resident/stored in the computer readable medium/memory 906, one or more hardware components coupled to the processor 904, or some combination thereof. The processing system 914 may be a component of the UE 120 of FIG. 2 and may include the memory 282, and/or at least one of the TX processor 264, the RX processor 258, and the controller/processor 280.

In one configuration, the apparatus 802 for wireless communication includes means for receiving, from a cell, system information indicating at least one cell selection parameter targeted to the first class of UEs, and means for performing a cell selection procedure based in part on the at least one cell selection parameter. The at least one cell selection parameter may be configured to bias the cell selection procedure to favor selection of the cell by UEs belonging to the first class of UEs. The apparatus 802 may also optionally include means for receiving supplemental information targeted to the first class of UEs to compensate for part of the system information not being successfully received by UEs in the first class of UEs. The aforementioned means may be one or more of the aforementioned components of the apparatus 802 and/or the processing system 914 of the apparatus 802 configured to perform the functions recited by the aforementioned means. As described supra, the processing system 914 may include the TX processor 264, the RX processor 258, and the controller/processor 280.

Figure 10:
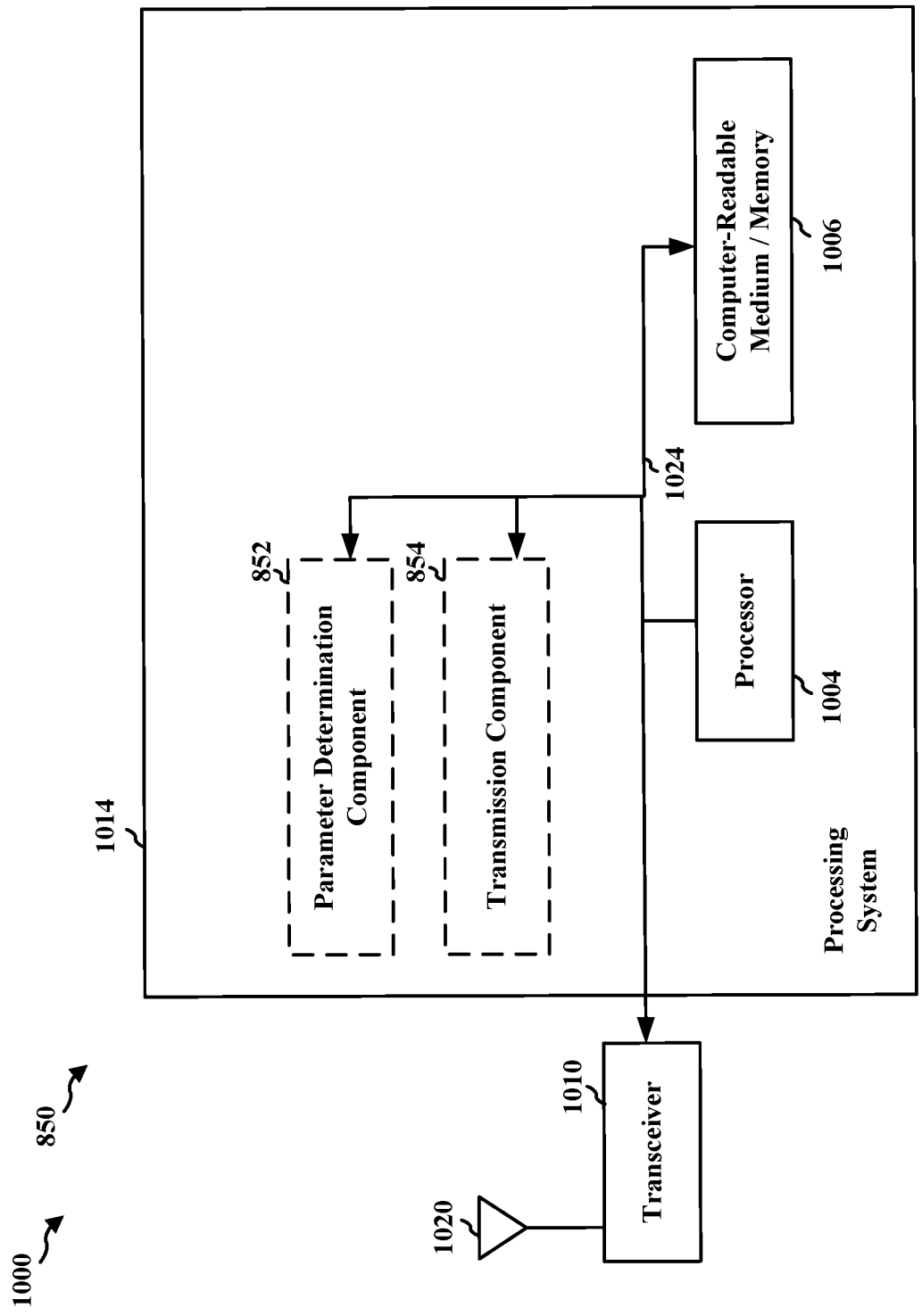
FIG. 10 is a diagram illustrating an example of a hardware implementation for an apparatus employing a processing system according to another aspect of the disclosure.

FIG. 10 is a diagram 1000 illustrating an example of a hardware implementation for an apparatus 850 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 852 and 854, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, specifically the transmission component 852, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 852 and 854. The components may be software components running in the processor 1004, resident/stored in the computer readable medium/memory 1006, one or more hardware components coupled to the processor 1004, or some combination thereof. The processing system 1014 may be a component of the BS 110 of FIG. 2 and may include the memory 242, and/or at least one of the TX processor 220, the RX processor 238, and the controller/processor 240.

In one configuration, the apparatus 850 for wireless communication includes means for determining at least one cell selection parameter targeted to a first class of UEs. The apparatus 850 for wireless communication further includes means for transmitting system information indicating the at least one cell selection parameter. The at least one cell selection parameter may be configured to bias UEs belonging to the first class of UEs to favor selection of the cell. The apparatus 850 may also optionally include means for transmitting supplemental information targeted to the first class of UEs in advance of the system information to compensate for part of the system information not being successfully received by UEs in the first class of UEs. The aforementioned means may be one or more of the aforementioned components of the apparatus 850 and/or the processing system 1014 of the apparatus 850 configured to perform the functions recited by the aforementioned means. As described supra, the processing system 1014 may include the TX processor 220, the RX processor 238, and the controller/processor 240.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE) associated with a first class of UEs, comprising:
receiving, from a cell, system information indicating at least one cell selection parameter targeted to the first class of UEs; and
performing a cell selection procedure based in part on the at least one cell selection parameter,
wherein the at least one cell selection parameter is configured to bias the cell selection procedure to favor selection of the cell by UEs belonging to the first class of UEs, and
wherein the at least one cell selection parameter comprises a measured reference signal received quality (RSRQ) offset that is specific to the first class of UEs, a measured reference signal received power (RSRP) offset that is specific to the first class of UEs, or both.

2. The method of claim 1, wherein the system information further indicates at least one other cell selection parameter targeted to a second class of UEs.

3. The method of claim 2, wherein the cell selection procedure is performed without factoring in the at least one other cell selection parameter targeted to the second class of UEs.

4. The method of claim 1, wherein the system information indicates the at least one cell selection parameter via a value that references a predetermined offset or threshold.

5. The method of claim 1, wherein the at least one cell selection parameter comprises an indication as to whether UEs belonging to the first class of UEs are barred from accessing the cell.

6. The method of claim 1, wherein the receiving comprises receiving multiple system information blocks (SIBs), and at least one of the multiple SIBs is targeted to both the first class of UEs and a second class of UEs.

7. The method of claim 1, receiving supplemental information targeted to the first class of UEs to facilitate decoding of the system information by the first class of UEs.

8. The method of claim 1,
wherein the first class of UEs correspond to reduced capability (RC) UEs,
wherein the cell corresponds to a gNB with support for geographic coverage enhancement of control data and traffic data for RC UEs.

9. The method of claim 1,
wherein the cell is a serving cell of the UE,
wherein the least one cell selection parameter comprises at least one cell reselection parameter related to a neighbor cell of the UE, and
wherein the cell selection procedure is a cell reselection procedure.

10. The method of claim 9, wherein the at least one cell reselection parameter comprises a received signal offset for the neighbor cell.

11. The method of claim 9,
wherein the first class of UEs correspond to reduced capability (RC) UEs,
wherein the neighbor cell corresponds to a gNB capable of providing support for geographic coverage enhancement of control data and traffic data for RC UEs.

12. The method of claim 9,
wherein the at least one cell reselection parameter comprises a black list of cells for which selection by the UE in association with the cell reselection procedure is prohibited, or
wherein the at least one cell reselection parameter comprises a white list of cells for which selection by the UE in association with the cell reselection procedure is allowed.

13. A method of operating a cell, comprising:
determining at least one cell selection parameter targeted to a first class of user equipments (UEs); and
transmitting system information indicating the at least one cell selection parameter,
wherein the at least one cell selection parameter is configured to bias UEs belonging to the first class of UEs to favor selection of the cell, and
wherein the at least one cell selection parameter comprises a measured reference signal received quality (RSRQ) offset that is specific to the first class of UEs, a measured reference signal received power (RSRP) offset that is specific to the first class of UEs, or both.

14. The method of claim 13, wherein the system information further indicates at least one other cell selection parameter targeted to a second class of UEs.

15. The method of claim 13, wherein the at least one cell selection parameter comprises a Reference Signal Received Power (RSRP) offset or a Reference Signal Received Quality (RSRQ) offset.

16. The method of claim 13, wherein the system information indicates the at least one cell selection parameter via a value that references a predetermined offset or threshold.

17. The method of claim 13, wherein the at least one cell selection parameter comprises an indication as to whether UEs belonging to the first class of UEs are barred from accessing the cell.

18. The method of claim 13, further comprising:
transmitting supplemental information targeted to the first class of UEs in advance of the system information to facilitate decoding of the system information by the first class of UEs.

19. The method of claim 13,
wherein the first class of UEs correspond to reduced capability (RC) UEs,
wherein the cell corresponds to a gNB with support for geographic coverage enhancement of control data and traffic data for RC UEs.

20. The method of claim 13,
wherein the cell is a serving cell of the UE,
wherein the least one cell selection parameter comprises at least one cell reselection parameter related to a neighbor cell of the UE.

21. The method of claim 20, wherein the at least one cell reselection parameter comprises a received signal offset for the neighbor cell.

22. The method of claim 20,
wherein the first class of UEs correspond to reduced capability (RC) UEs,
wherein the neighbor cell corresponds to a gNB with support for geographic coverage enhancement of control data and traffic data for RC UEs.

23. The method of claim 20,
wherein the at least one cell reselection parameter comprises a black list of cells for which selection by the UE in association with the cell reselection procedure is prohibited, or
wherein the at least one cell reselection parameter comprises a white list of cells for which selection by the UE in association with the cell reselection procedure is allowed.

24. A user equipment (UE) associated with a first class of UEs, comprising:
a memory; and
at least one processor coupled to the memory and configured to:
receive, from a cell, system information indicating at least one cell selection parameter targeted to the first class of UEs; and
perform a cell selection procedure based in part on the at least one cell selection parameter,
wherein the at least one cell selection parameter is configured to bias the cell selection procedure to favor selection of the cell by UEs belonging to the first class of UEs, and
wherein the at least one cell selection parameter comprises a measured reference signal received quality (RSRQ) offset that is specific to the first class of UEs, a measured reference signal received power (RSRP) offset that is specific to the first class of UEs, or both.

25. The UE of claim 24,
wherein the cell is a serving cell of the UE,
wherein the least one cell selection parameter comprises at least one cell reselection parameter related to a neighbor cell of the UE, and
wherein the cell selection procedure is a cell reselection procedure.

26. A cell, comprising:
a memory; and
at least one processor coupled to the memory and configured to:
   determine at least one cell selection parameter targeted to a first class of user equipments (UEs); and
   transmit system information indicating the at least one cell selection parameter,
   wherein the at least one cell selection parameter is configured to bias UEs belonging to the first class of UEs to favor selection of the cell UEs, and
   wherein the at least one cell selection parameter comprises a measured reference signal received quality (RSRQ) offset that is specific to the first class of UEs, a measured reference signal received power (RSRP) offset that is specific to the first class of UEs, or both.

27. The cell of claim 26,
wherein the first class of UEs correspond to reduced capability (RC) UEs,
wherein the cell corresponds to a gNB with support for geographic coverage enhancement of control data and traffic data for RC UEs.

* * * * *